(12) United States Patent
Sinha et al.

(10) Patent No.: US 8,464,102 B2
(45) Date of Patent: Jun. 11, 2013

(54) METHODS AND SYSTEMS FOR DIAGNOSING HARDWARE AND SOFTWARE FAULTS USING TIME-STAMPED EVENTS

(75) Inventors: Purnendu Sinha, Bangalore (IN); Dipankar Das, Aundh (IN)

(73) Assignee: GM Global Technology Operations LLC, Detroit, MI (US)

( * ) Notice: Subject to any disclaimer, the term of this patent is extended or adjusted under 35 U.S.C. 154(b) by 375 days.

(21) Appl. No.: 12/977,405

(22) Filed: Dec. 23, 2010

(65) Prior Publication Data
US 2012/0166878 A1 Jun. 28, 2012

(51) Int. Cl.
*G06F 11/00* (2006.01)
(52) U.S. Cl.
USPC ................................................ 714/39; 714/26
(58) Field of Classification Search
USPC ...................... 714/1, 26, 37, 39, 51
See application file for complete search history.

(56) References Cited

U.S. PATENT DOCUMENTS

| | | | | |
|---|---|---|---|---|
| 6,807,583 B2* | 10/2004 | Hrischuk et al. | ............... | 719/318 |
| 7,379,846 B1* | 5/2008 | Williams et al. | ............... | 702/185 |
| 7,895,471 B2* | 2/2011 | Boone et al. | ................... | 714/25 |
| 8,166,351 B2* | 4/2012 | Slutsman et al. | ............... | 714/48 |
| 8,245,079 B2* | 8/2012 | Hughes et al. | ................... | 714/26 |
| 2003/0028823 A1* | 2/2003 | Kallela et al. | ................... | 714/26 |
| 2007/0220344 A1* | 9/2007 | Bett et al. | ......................... | 714/37 |
| 2010/0218031 A1* | 8/2010 | Agarwal et al. | ................... | 714/2 |
| 2011/0154119 A1* | 6/2011 | Wang et al. | ..................... | 714/37 |
| 2011/0209001 A1* | 8/2011 | Simma et al. | ................... | 714/26 |
| 2011/0214020 A1* | 9/2011 | Caspi et al. | ..................... | 714/37 |
| 2011/0231704 A1* | 9/2011 | Ge et al. | ......................... | 714/26 |
| 2012/0054554 A1* | 3/2012 | Dagan | ............................. | 714/39 |

* cited by examiner

*Primary Examiner* — Marc Duncan
(74) *Attorney, Agent, or Firm* — Parks IP Law LLC; Mickki D. Murray (57) ABSTRACT

A transportation vehicle including a high-resolution clock, an electronic network including two or more tasks, including first and second tasks, and a memory including instructions causing a processor to classify faults in the electronic network using the clock. The steps include receiving a first fault code generated at the first task, receiving a second fault trouble code generated at the second task of the electronic system in response to a second fault, and identifying an execution cycle offset associated with the first and second tasks using an execution schedule, and considering whether the first cycle is separated from the second cycle by the execution cycle offset identified by the schedule. The instructions also cause the processor to identify causal relationships for a plurality of faults via a pair-wise repetition of the above-described analysis for at least one combination of tasks other than the first and second tasks.

20 Claims, 2 Drawing Sheets

METHODS AND SYSTEMS FOR DIAGNOSING HARDWARE AND SOFTWARE FAULTS USING TIME-STAMPED EVENTS

TECHNICAL FIELD

The present disclosure relates generally to methods and systems for diagnosing hardware and software faults and, more particularly, to methods and systems for diagnosing hardware and software faults by time-stamping events.

BACKGROUND

Faults often occur in one or more tasks of multi-task electronic systems. An example of such a multi-task systems is the electronic system of modern automobiles. Tasks include software, such as computing modules of an onboard computer, and hardware, such as sensors or other electronic inputs to the computer, or a combination of the aforesaid, such as in the case of smart sensors.

In many instances, a fault in one task will lead to a fault in one or more other tasks of the system. When a plurality of tasks fail, it can be difficult to determine whether any of the faults were related, such as by one fault having caused another of the faults. And, if related, it can be difficult to accurately determine which fault(s), if any, correlate to which other fault(s). This challenge is complicated by the fact that fault messages initiated by an earlier-faulting task can be sent and/or received later than the sending and/or receipt of a fault message from a later-faulting task, thus making it impossible to accurately identify correlation between the faults based solely on timing of the resulting fault messages.

SUMMARY

The present disclosure relates to a transportation vehicle including a high-resolution time component, an electronic network including a first task and a second task, the electronic network being configured to utilize a time-triggered communication system based on the high-resolution time component; and an onboard computer. The onboard computer includes a processor and a tangible, non-transitory computer-readable medium including instructions that, when executed by the processor, cause the processor to perform steps for classify faults in the electronic network. The steps include (i) receiving a first fault code generated at a first task of the electronic system in response to a first fault at the first task, wherein the first fault code identifies (a) a first communication cycle of the electronic system associated with the first fault and (b) a first slot, corresponding to the first task, of a first message in which the first fault code is transmitted to the processor. The steps also include (ii) receiving a second fault trouble code generated at a second faulting task of the electronic system in response to a second fault, wherein the second fault code identifies (1) a second communication cycle of the electronic system associated with the second fault; and (2) a second slot, corresponding to the second task, of a second message in which the second fault code is transmitted to the processor. The first slot and the second slot are populated with the first fault code and the second fault code, respectively, based on time synchronized with respect to the high-resolution time component. The steps also include (iii) identifying an execution cycle offset associated with the first task and the second task using an execution schedule, and (iv) considering whether the first cycle, of the first fault trouble code, is separated from the second cycle, of the second fault trouble code, by the execution cycle offset identified by the schedule. The steps further include (v) if the first cycle is not separated from the second cycle by the execution cycle offset, determining that the first fault did not cause the second fault, (vi) if the first cycle is separated from the second cycle by the execution cycle offset, considering whether operation of any of the tasks is dependent on operation of any other of the tasks based on task-dependency data, (vii) if operation of none of the tasks is dependent on operation of another of the tasks, determining that the first fault and the second fault are coincidental, and (viii) if operation of at least one of the tasks is dependent on operation of at least one other of the tasks, considering whether operation of the second task is dependent on operation of the first task. The steps also include, (ix) if operation of the second task is dependent on operation of the first task, determining that the failure of the first task caused the failure in the second task, and (x) if operation of the second task is not dependent on operation of the second task, determining that the first fault did not cause the second fault.

The present disclosure also relates to a method executed by a computer processor of an observing device for classifying faults in an electronic network utilizing a time-triggered communication system and a high-resolution time component. The method includes (i) the processor receiving a first fault code generated at a first task of the electronic system in response to a first fault at the first task, wherein the first fault code identifies: (a) a first communication cycle of the electronic system associated with the first fault, and (b) a first slot, corresponding to the first task, of a first message in which the first fault code is transmitted to the processor. The method also includes (ii) the processor receiving a second fault trouble code generated at a second faulting task of the electronic system in response to a second fault. The second fault code identifies (1) a second communication cycle of the electronic system associated with the second fault, and (2) a second slot, corresponding to the second task, of a second message in which the second fault code is transmitted to the processor. The first slot and the second slot are populated with the first fault code and the second fault code, respectively, based on time synchronized with respect to the high-resolution time component. The method further includes (iii) the processor identifying an execution cycle offset associated with the first task and the second task using an execution schedule and (iv) the processor considering whether the first cycle, of the first fault trouble code, is separated from the second cycle, of the second fault trouble code, by the execution cycle offset identified by the schedule. The method also includes (v) if the processor determines that the first cycle is not separated from the second cycle by the execution cycle offset, the processor further determining that the first fault did not cause the second fault, and (vi) if the processor determines that the first cycle is separated from the second cycle by the execution cycle offset, the processor considering whether operation of any of the tasks is dependent on operation of any other of the tasks based on task-dependency data. The method yet further includes (vii) if the processor determines that operation of none of the tasks is dependent on operation of another of the tasks, the processor further determining that the first fault and the second fault are coincidental, and (viii) if the processor determines that operation of at least one of the tasks is dependent on operation of at least one other of the tasks, the processor considering whether operation of the second task is dependent on operation of the first task. The method also includes (ix) if the processor determines that operation of the second task is dependent on operation of the first task, the processor further determining that the failure of the first task caused the failure in the second task, and (x) if the processor determines that operation of the second task is not dependent on operation of the second task, the processor further determining that the first fault did not cause the second fault.

The present disclosure further relates to a tangible, non-transitory computer-readable medium of an observing device including instructions that, when executed by a processor, cause the processor to perform steps for classify faults in an electronic network utilizing a time-triggered communication system and a high-resolution time component. The steps include (i) receiving a first fault code generated at a first task of the electronic system in response to a first fault at the first task, wherein the first fault code identifies (a) a first communication cycle of the electronic system associated with the first fault and (b) a first slot, corresponding to the first task, of a first message in which the first fault code is transmitted to the processor. The steps also include (ii) receiving a second fault trouble code generated at a second faulting task of the electronic system in response to a second fault, wherein the second fault code identifies (1) a second communication cycle of the electronic system associated with the second fault; and (2) a second slot, corresponding to the second task, of a second message in which the second fault code is transmitted to the processor. The first slot and the second slot are populated with the first fault code and the second fault code, respectively, based on time synchronized with respect to the high-resolution time component. The steps also include (iii) identifying an execution cycle offset associated with the first task and the second task using an execution schedule, and (iv) considering whether the first cycle, of the first fault trouble code, is separated from the second cycle, of the second fault trouble code, by the execution cycle offset identified by the schedule. The steps further include (v) if the first cycle is not separated from the second cycle by the execution cycle offset, determining that the first fault did not cause the second fault, (vi) if the first cycle is separated from the second cycle by the execution cycle offset, considering whether operation of any of the tasks is dependent on operation of any other of the tasks based on task-dependency data, (vii) if operation of none of the tasks is dependent on operation of another of the tasks, determining that the first fault and the second fault are coincidental, and (viii) if operation of at least one of the tasks is dependent on operation of at least one other of the tasks, considering whether operation of the second task is dependent on operation of the first task. The steps also include, (ix) if operation of the second task is dependent on operation of the first task, determining that the failure of the first task caused the failure in the second task, and (x) if operation of the second task is not dependent on operation of the second task, determining that the first fault did not cause the second fault.

Other aspects of the present invention will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, microprocessor-based electronics, single-core or multi-core systems, combinations thereof, and the like.

I. General Overview of the Disclosure

The present disclosure describes a diagnostic module and methods for diagnosing hardware and/or software faults by time-stamping the fault events. More particularly, a fine-resolution, synchronized clock is used to identify slots of one or more communication message cycles in which faults occurred. Other inputs to the diagnostic module include a graph of system tasks, a map of system resources, and a communication/execution schedule for the system. Using these inputs, the diagnostic module determines whether two or more faults are coincidental, correlated, or uncorrelated.

Although the present invention is described primarily by way of example with respect to automotive systems, wherein system tasks include software and hardware components of an automobile, the teachings of the present disclosure are not limited to use with automobiles and can be used to diagnose and improve other electronic and computer systems.

II. Exemplary Fault Scenario

Figure 1:
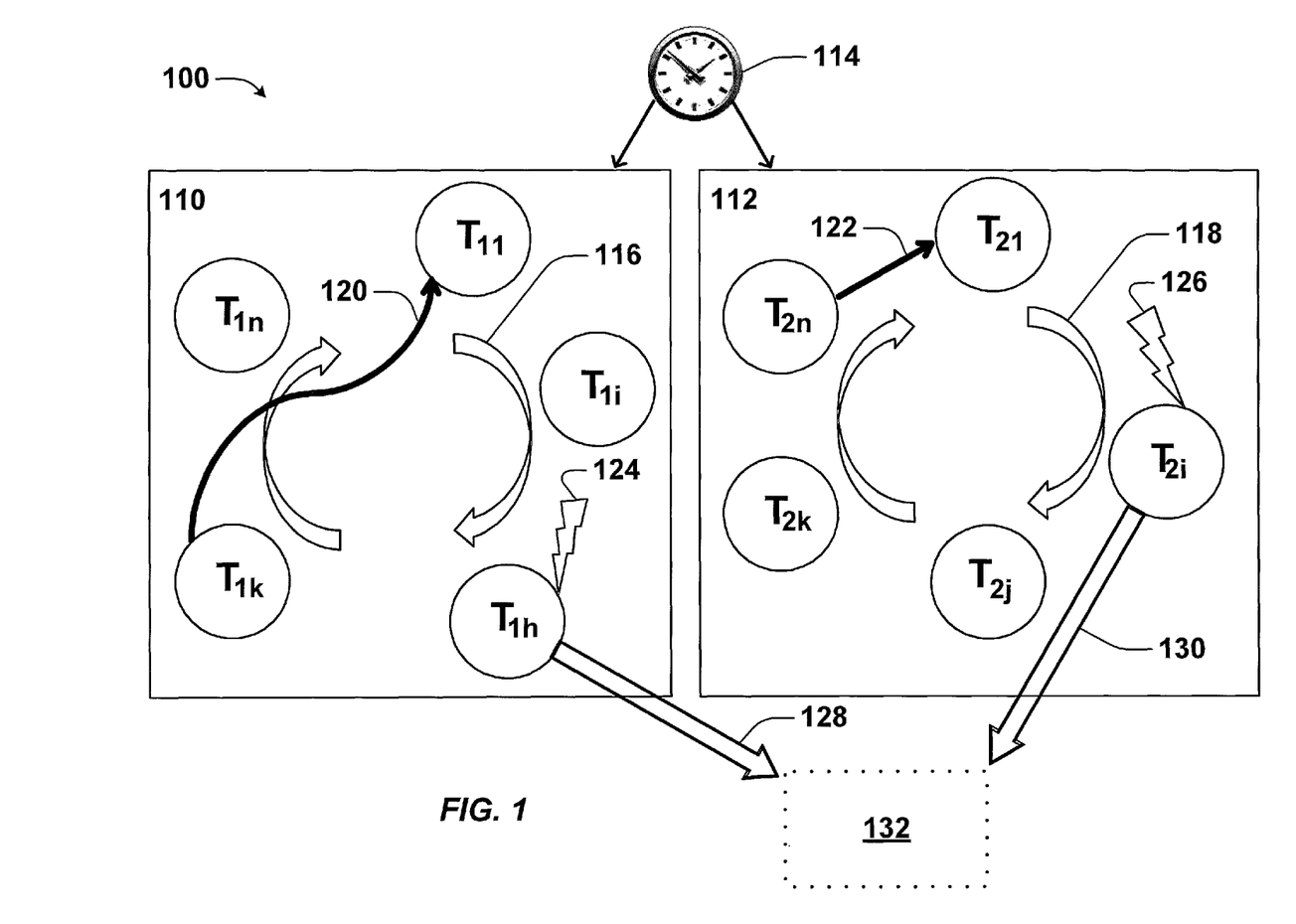
FIG. 1 illustrates cyclic schedules of two electronic control units (ECUs) and a diagnostic trouble code emanating from one of the tasks of the schedule of each ECU, according to an embodiment of the present disclosure.

Turning now to the figures, FIG. 1 illustrates a system 100 including respective cyclic schedules of two electronic control units (ECUs) 110, 112. The ECUs can be parts of an automobile (not shown in detail) or another computerized system. While two ECUs 110, 112, such as computing nodes, are shown by way of example, it will be appreciated that the teachings of the present disclosure can be used similarly to diagnose faults occurring in one ECU or three or more ECUs.

Each ECU 110, 112 is associated with a synchronized clock 114. The ECUs 110, 112 are associated with the same synchronized clock 114. Local clocks in each ECU 110, 112 can be linked to the global clock 114, and periodically synchronized to the global clock 114 (e.g., every second, or more or less) to ensure that each ECU 110, 112 (e.g., tasks thereof) are operating on the same time basis. Clock synchronization is in some embodiments managed by one or more clock synchronization algorithms, which are a part of a time-triggered communication system controlling communications within the system 100, as described further below.

Each ECU 110, 112 also includes a plurality of tasks T. The tasks T of each ECU 110, 112 operate within respective cycles, or cyclic schedules 116, 118 of the ECUs 110, 112. The execution of the tasks T is time-triggered, with reference to the synchronized time. Particularly, for instance, each task T executes in pre-designated time-slots, similar to how messages within the system 100 are communicated in pre-designated time-slots in the time-triggered communication system.

In some embodiments, tasks T execute cyclically. With reference to FIG. 1, for example, the tasks T execute as follows: $T_{11}, T_{1i}, T_{1h}, T_{1k}, T_{1n}, T_{11}, T_{1i}$, etc.). Messages from the tasks T are likewise sent out cyclically.

In some embodiments, at least one of the tasks T is a segment of computer code, which can be referred to as a computing task, a piece of hardware (e.g., a sensor or other electronics), which can be referred to as a sensing task, or a combination of the two. The tasks T may include, for example, execution of software, a sensor action, an actuator action, or another hardware device executing a function, such as an application-specific integrated circuit (ASIC).

Although diagnosis of faults is described in connection with nodes T operating in different ECUs 110, 112, and cyclic schedule 116, 118, the teachings of the present disclosure can be used to diagnose faults occurring in the same ECUs, different ECUs, the same cycle, different cycles, or a combination of these, such as three faults occurring in three tasks, two being of the same cycle of one ECU and the third fault occurring in a task of a different cycle end ECU.

Timing of operations within the cyclic schedules 116, 118 are controlled by the synchronized clock(s) 114. A timer or other time-based variable of each task T may be periodically updated, or corrected, with reference to the synchronized clock 114. It is contemplated that the synchronized clock 114 may itself be periodically updated, such as with reference to another clock, such as a global positioning system (GPS) clock, though this is not necessary.

Each task T is a software module, such as a program or sub-program of the ECU 110, 112, a hardware module of the ECU 110, 112, such as electronic equipment, or a software-hardware combination of the ECU 110, 112. An exemplary electronic hardware module constituting a task T is a vehicle sensor, such as a speed sensor. An exemplary software module is a computer application, stored on a computer-readable medium (e.g., an automotive onboard computer).

Particularly exemplary software faults include: (1) memory corruption faults, such as stack overflow, buffer overflow, segmentation faults (also known as memory exceptions), and paging faults, (2) scheduling bugs such as missed release time, which may result from bugs in the operating system or inadequate design of interrupts and/or exceptions, and (3) faults triggered by malicious attacks to a wireless sensor networks. Exemplary hardware faults include (a) design bugs/faults, such as improper implementation of out-of-order pipelines, and (b) memory/bus faults resulting from soft errors, which in turn lead to software faults.

Further in FIG. 1, two dependencies 120, 122 between tasks T are expressly shown, one in each of the ECUs 110, 112. A dependency between tasks exists when operation of one task (e.g., task $T_{11}$ in the first ECU 110 and task $T_{21}$ in the second ECU 112) depends in some manner on, or is influenced in some manner by, operation of another task (e.g., task $T_{1k}$ in the first ECU 110 and task $T_{2n}$ in the second ECU 112). For instance, the task $T_{11}$ of the first ECU 110 could be a software module requiring output from the other task $T_{1k}$ of the first ECU 110 in order to perform its operations, where the other task $T_{1k}$ is a software module or software/hardware module. Similarly, for example, the task $T_{21}$ of the second ECU 112 could be a software and/or hardware module requiring output from the other task $T_{2n}$ of the second ECU 112 in order to perform its operations, wherein the other task $T_{2n}$ is a software and/or hardware module.

While task $T_{11}$ depending on task $T_{1k}$, and task $T_{21}$ depending on task $T_{2n}$, are given as exemplary dependencies, dependencies between any various other tasks (e.g., amongst $T_{1k}$, $T_{1n}, T_{11}, T_{1i}, T_{1h}, T_{2k}, T_{2n}, T_{21}, T_{2i}, T_{2j}$, given only as exemplary tasks and not to be limited thereto) may exist and are evaluated similarly according to the present technology.

Further, operation of a task T could be dependent in some way on, or influenced in some way by, operation of one or more tasks T of one or more than one ECU 110, 112.

Also, operation of the task $T_1$ in the first ECU 110 and the task $T_n$ in the second ECU 112 relate to operation of the same task $T_k$ being present in both ECUs. It will further be appreciated that while $T_i$ is a part of both ECUs 110, 112, the fault occurring in the task $T_i$, which is described more below, occurs in connection with a role of the task $T_i$ in only one of the cycles 118.

The illustrated dependencies are provided only as examples, and other dependencies (not shown in detail) may exist between the tasks shown related to the dependencies and another task, between other pairs, or between three or more various tasks T. Operation of any task T may depend on operation of multiple other tasks T, and/or a plurality of tasks T may depend on operation of a single other task T. Such system dependencies can be stored in a task graph and/or a resource map as described in further detail, below.

Accurate diagnosis of the faults within the system 100 provides various benefits. Diagnosis of faults includes identification of the task or tasks that faulted and the cause of the fault, such as one or more other tasks, or a process internal to the task. Exemplary benefits of accurate diagnosis of faults include the ability to remedy or mask faults to avoid future occurrence, enable operation around the faults, and re-map system architecture, or otherwise alter system architecture, to alleviate the identified faults. Effective diagnosis includes identifying causal relationships between any two or more faults when multiple faults and such relationships exist. In some embodiments, given that multiple faults have occurred, a pair-wise analysis of tasks (i.e., comparing two tasks at a time) to identify partial dependencies (relationships) among the faults. Inferred partial dependencies are compiled to determine a causal sequence of faults.

Accurate determination of causal relationships cannot depend solely on operational dependence, or even on operation dependence and fault timing alone. For instance, even when a fault in a first task (e.g., task $T_{11}$ in the first ECU 110) is preceded by a fault in a second task (e.g., task $T_{1k}$ in the first ECU 110) on which the first task depends, it cannot be concluded with certainty or a high level of confidence based on only this information that the fault in the second task caused the fault in the first task. For instance, the fault in the first task could have been completely independent of the fault in the second task, or result from a combination of faults including or not including the second task.

Each note T includes a computing component configured to generate a code in response to a fault in the task T. Particularly, for example, when a fault occurs, the faulting task T generates a trouble code, or fault code, such as a diagnostic trouble code (DTC), identifying the faulting task T.

The manner by which the DTC identifies the task can depend on the communication architecture being used. In an automobile for example, an exemplary communication architecture uses time-triggered (TT) messaging over an intra-vehicle communication network. These types of architecture, commonly referred to as time-triggered communication systems, control communications within the system 100, as described further below. An exemplary time-triggered communication system is a TT-Ethernet network.

Generally, in a time-triggered communication system, all nodes in the system share a global, synchronized notion of time. Synchronization may be achieved by, for example, periodic clock corrections. Also in time-triggered communication systems, time is partitioned into slots, and a node can communicate a message (data) in a pre-defined slot, in which case the message is time stamped to indicate the slot. Hence, if a message is sent in a given slot, it can be determined, such as by a device or personnel evaluating the system, that the message was time-stamped by the slot in which it is sent out. If the node does not send a message in its assigned stamp, other nodes cannot communicate in the slot.

DTCs indicate a failure, such as by identifying that a failure occurred and a time instance of the failure, such as by inclusion of a communication or execution cycle identifier.

Time-triggered communication systems require use of a global time, such as the time maintained by the synchronous clock 114, and use of a fault-tolerant midpoint algorithm. In some cases a combined time-triggered communication system is used. Any one or more time-triggered communication systems may be used, such as those commonly used in automotive applications.

As provided, the such a synchronized system, or network, is used to schedule real-time tasks and communication of messages in and through the network. External devices can be used to identify types of messages (e.g., whether they are DTC messages), and whether the messages include information regarding the communication cycle in which any faults associated with a DTC occurred. An exemplary external device is a CANoe Analyzer. Accurate message identification and interpretation can be tested by purposeful injection or other causing of faults and analysis of resulting operations.

Messages can include conventional components, such as a header, a payload, and a trailer. In some embodiments, the message identifies a communication cycle corresponding to the message, such as in the message header and/or trailer. Further, each message is associated with a time code, or time stamp, indicating the slot in which the message was (e.g., DTC code) was transmitted over the communication bus.

In a preferred embodiment, the synchronized clock 114 has very-fine resolution enabling extremely accurate time stamping. While current ultra-fine resolution clocks have a resolution down to about 50 μsec, clocks have higher resolution are contemplated and can be implemented into the technologies of the present disclosure.

In an exemplary embodiment, time-triggered messages include a static segment and a dynamic segment, and each task T is assigned a slot in the static (ST) segment. Generally, tasks T communicate time-stamped DTCs in their respective assigned static message slots. By knowing the static message slot assigned to each task, the central processor (e.g., onboard computer), determines the task T originating the DTC by the slot in which the DTC is transmitted.

In some embodiments, the static (ST) segments are generally reserved for use in connection with time-triggered messages and the dynamic (DYN) segments are generally reserved for event-triggered messages. In certain scenarios, such as when there is limited bandwidth in a message, a static slot cannot be assigned for payload from the computing task T. In some instances, the task T can communicate the time-stamped DTC in a dynamic segment of the message. The DTC may also be sent in a dynamic segment if the DTC from a particular task T is raised toward the end of a communication cycle static segment, after the time for populating the assigned static segment for the particular task T has passed.

Continuing with reference to FIG. 1, exemplary faults 124, 126 are schematically shown as occurring in tasks $T_{1h}$ and $T_{2i}$ of the first and second ECUs 110, 112, respectively. In response to the faults 124, 126, the tasks $T_{1h}$ and $T_{2i}$ generate respective DTCs 128, 130. Each DTC includes an indication of the task experiencing the fault, a communication cycle in which the fault occurred or is being reported, and a time stamp indicating a time at which the fault occurred or that the DTC was generated.

For instance, the DTC code may be a part of a software/electronics error notification (software/electronics DTC) also identifying the ECU/sensor/actuator/etc. (task), which failed in cases in which the DTC reports an electronics failure, or the software component (task) which failed in cases in which the DTC denotes a software failure. The DTC code indicates the type of failure, such as software memory fault, timing fault, ECU failure, Memory failure, or others.

The DTCs are sent to a diagnosing module, or observing device 132, such as the processor of an onboard computer of a subject vehicle. The observing device 132 analyzes the DTCs to diagnose the associated faults according to the diagnostic algorithm of the present invention described in further detail below.

When faults occur relatively near in time, such as occurring in the same communication cycle or within one or a few cycles of each other, effective diagnosis includes determination of whether the faults were correlated, uncorrelated, or coincidental. However, as provided above, it can be difficult to determine which of these relationships is appropriate. This challenge is complicated by the fact that fault messages initiated by an earlier-faulting task can be sent later than a fault message of a later-faulting task, thus making it impossible to identify correlation between the faults based solely on timing of the resulting fault messages.

III. Diagnostic Algorithm

Figure 2:
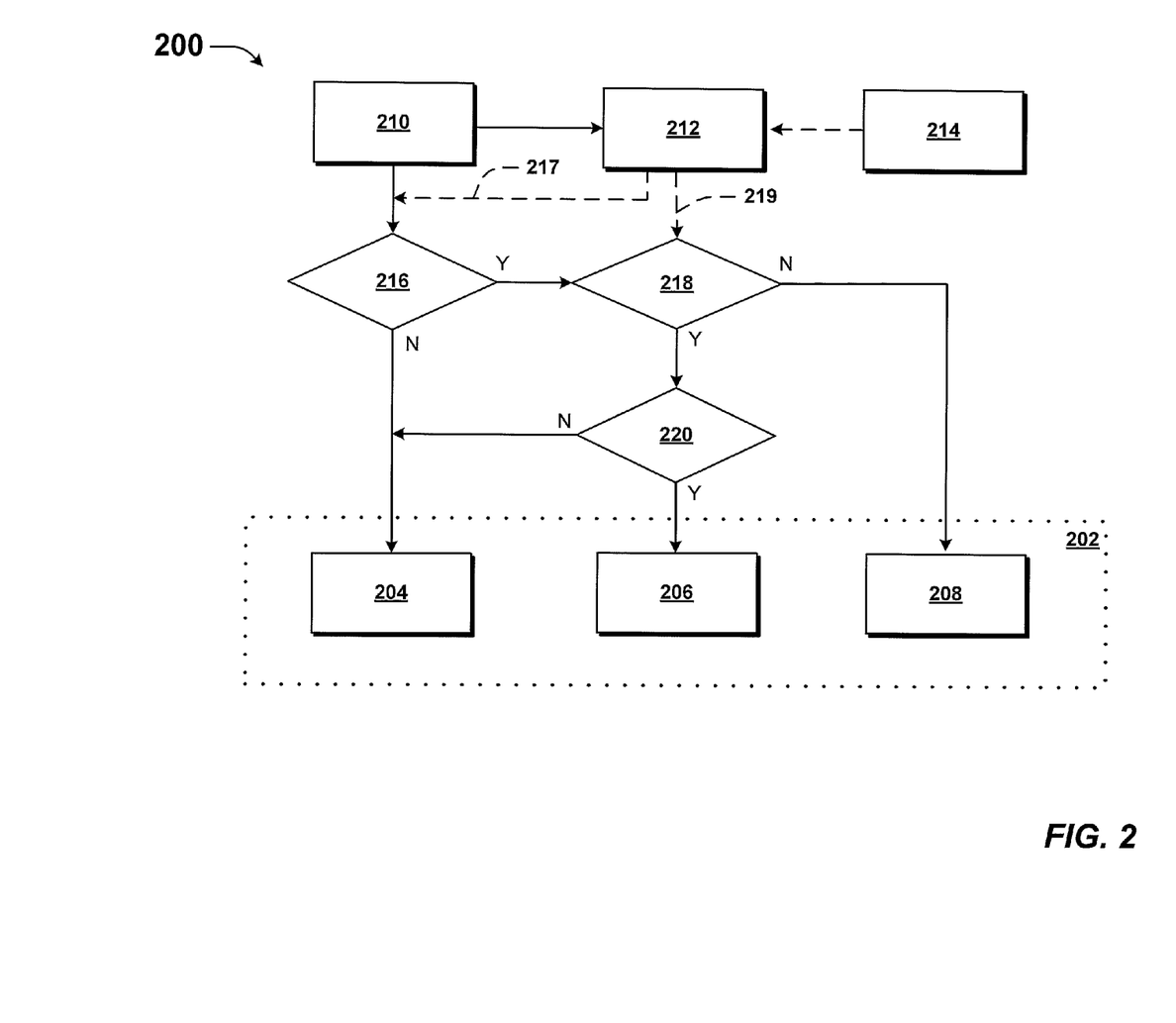
FIG. 2 illustrates an exemplary diagnostic method for determining whether the faults shown in FIG. 1 are coincidental, correlated, or uncorrelated, according to an embodiment of the present disclosure.

FIG. 2 illustrates a method 200 corresponding to an exemplary diagnostic algorithm for classifying faults, such as the faults 124, 126 shown in FIG. 1, according to an embodiment of the present disclosure.

It should be understood that the steps of the method 200 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 200 can be ended at any time.

In certain embodiments, some or all steps of this process, and/or substantially equivalent steps are performed by execution of computer-readable instructions stored or included on a computer-readable medium, for example. For instance, references to a processor performing functions of the present disclosure refer to any one or more interworking computing components executing instructions, such as in the form of an algorithm, provided on a computer-readable medium, such as a memory associated with the observing device 132.

A goal of the method 200 is to determine an appropriate classification 202 describing a relationship or non-relationship amongst the occurrence of two or more faults 124, 126 in the system 100. Particularly, the algorithm of the method 200 facilitates accurate determination of whether the faults should be classified as uncorrelated 204, correlated 206, or coincidental 208, as provided below in further detail.

At step 210, a processor receives DTCs from the faulting tasks $T_{1h}$ and $T_{2i}$. The DTCs from these tasks $T_{1h}$ and $T_{2i}$ can be referred to for explanatory purposes as d1: $T_{1h}$; Slot_g; CC_p, and d2: $T_{2i}$; Slot_v; CC_m, respectively, wherein p identifies a communication cycle of the first ECU 110 in which the fault 124 of the one task $T_{1h}$ occurred and/or the cycle in which the fault 126 was reported, and m identifies a communication cycle of the second ECU 112 in which the fault 126 of the other task $T_{2i}$ occurred and/or the cycle in which the fault 126 was reported. The reference character g refers to a slot of the transmitting message that the DTC d1 is provided in, being the assigned slot for the corresponding task $T_{1h}$, and v refers to a slot of the transmitting message that the other DTC d2 is provided in, being the assigned slot for the corresponding task $T_{2i}$.

At step 212, the processor identifies or obtains an execution cycle offset O. In some embodiments the processor identifies the offset O based on inputs 214 including a communication/execution schedule. The schedule can include a time-driven table having release times of task executions and message communications.

As noted, the tasks T can operate in a cyclic nature according to the global, synchronized time. This cyclical execution of tasks T may be referred to as the execution cycle. The execution cycle offset O represents a number of cycles separating two related tasks T (e.g., operation of one of the two nodes depends on information from the other node). For example, if data produced by a first task T in a first cycle (cycle 1) is consumed, or used, by a second task T in a third cycle (cycle 3), the data-dependency is not in-cycle, and, particularly, the offset O between these tasks is two (2).

In another example, if a schedule is T2, T1,-T2, T1, etc., wherein T2 executes before T1 and consumes the output of T1 in the previous cycle, the cycle offset O would be one (1).

At step 216, the processor determines whether the cycle of the one DTC d1: $T_{1h}$; Slot_g; CC_p is separated from the other DTC d2: $T_{2i}$; Slot_v; CC_m by the execution cycle offset O received 217 from step 212, or:

$$CC\_p=CC\_m+O?$$

If at step 216 the processor determines that the cycle of the one DTC d1: $T_{1h}$; Slot_g; CC_p is not separated from the other DTC d2: $T_{2i}$; Slot_v; CC_m by the execution cycle offset O, or:

$$CC\_p \neq CC\_m+O,$$

then the processor determines that the failure of the task $T_h$ did not cause the failure of the other task $T_i$. The faults are determined to be uncorrelated because they occurred in different processing steps. If one fault was correlated with the other, the second would have occurred in the same processing step—e.g., in a cycle offset from the first cycle by the determined offset O value.

The method 200 may be performed (e.g., re-performed) with respect to other offsets O and from other perspectives. In some cases, at least one task (e.g., $T_i$) keeps a buffer of one or more recent values (e.g., 5 recent values) generated by at least one other tasks (e.g., $T_h$). The one task (e.g., $T_i$) could thus use the one or more recent values (e.g., 5 recent values) generated by the at least one other tasks (e.g., $T_h$). As such, the method 200 could be performed from the perspective of the one task with respect to each value received from the other task. For instance, if five (5) recent values, from five immediately preceding and consecutive cycles, are used, then the method 200 could be performed once for each offset O 1 to 5. In one embodiment, the method 200 is re-performed from the perspective of the task $T_h$ being dependent on the second $T_i$, as described further below, to determine whether the tasks are correlated in a different way. In at least some these scenarios, the goal is to analyze many, most, or all relevant combinations of tasks, and further multiple offsets O for these combinations.

If at step 216 the processor determines that the cycle of the one DTC d1: $T_i$; Slot_g; CC_p is separated from the other DTC d2: $T_h$; Slot_v; CC_m by the execution cycle offset O, or:

$$CC\_p=CC\_m+O,$$

then flow proceeds to step 218, whereat the processor considers whether the second task $T_i$ is dependent on the first task $T_h$, or:

$$T_i \rightarrow T_h?$$

For the consideration of step 218, the processor utilizes task dependency data 219 arranged at step 212. The task dependency data 219 is arranged based on inputs 214 including at least one task graph and at least one resource map. The task graph can identify tasks, or computing tasks, that are running in the system, and relations (e.g., dependencies or influences) between the tasks. The graphs can further identify task ordering and inter-task communications.

The resource map identifies resources that are required for tasks, or operation of computing tasks. Exemplary required resources can include, for example, a software task, an actuator, a sensor, a communication bus, etc. The resource map can also map tasks to ECUs and messages to communication networks, and system hardware (e.g., sensors/actuators) to ECUs/communication network.

The dependencies or influences among computing tasks T identified in the task graph and resource map can be any of a variety of types. For example, the task graph may include an execution dependency between two tasks, wherein output of a first one of the tasks is required for execution of a second of the two tasks. In this example, if the first task fails, and thereby locks (e.g., operation is halted), for instance, then the second task is locked from receiving the needed data.

The resource map can identify relationships between two tasks such as where the tasks have a common resource. The common resource could be, for example, an input from a component of a subject vehicle (e.g., sensor) or a third task, the operation of which affects operation of each of the first two tasks.

If at step 218, the processor determines that neither of the tasks $T_i$, $T_h$ is dependent on the other task $T_h$, $T_i$, or:

$$T_h \not\rightarrow T_i \text{ and } T_i \not\rightarrow T_h,$$

then the processor determines that the failures are coincidental 208. This conclusion is reached because if operation of the tasks $T_h$, $T_i$ is not linked to each other per the task graph and/or the resource map in any way, then it is not possible for the fault of one to cause, or be linked relevantly to, the fault in the other. Accordingly, the two failures occurring are considered coincidental 208.

If at step 218, the processor determines that at least one of the tasks $T_i$, $T_h$ is dependent on, or influenced by, the other task $T_h$, $T_i$, or:

$$T_h \rightarrow T_i \text{ and/or } T_i \rightarrow T_h,$$

then flow proceeds to step 220, whereat the processor determines whether operation of $T_i$ is dependent on operation of $T_h$, or:

$$T_h \rightarrow T_i?$$

The determination of step 218 is analyzed based on the task dependency data 219 arranged at step 212. As provided, the task dependency data 219 is based on the task graph and/or the resource map.

If at step 220 the processor determines that operation of the first task $T_i$ is related to operation of the other task $T_h$, or:

$T_h \rightarrow T_i$, then the processor determines that the failure of the one task $T_h$ caused the failure in the other task $T_i$. This determination is related to a likelihood of causation, wherein there is a very low probability that two tasks being dependent and failing in a specific pattern (e.g., in-line cycle relationship) are unrelated. As such, the present method provides a strong indicator, such as to an evaluating device or person, towards what went wrong in the system 100.

If at step 220 the processor determines that operation of the first task $T_i$ is not related to operation of the other task $T_h$, or:

$T_h \not\rightarrow T_i$, then the processor determines that the failure of each task $T_h$ did not cause the failure of the other task $T_i$. That is, the processor determines that the failures in $T_h$ and $T_i$ are uncorrelated 204 from the perspective of task $T_i$ being dependent on task $T_h$. As provided, the method 200 may be performed (e.g., re-performed) with respect to other offsets O and from other perspectives, such as from the perspective of the task $T_h$ being dependent on the second $T_i$ in the consideration of step 220, to determine whether the tasks are correlated in a different way.

For scenarios involving more than two faulting tasks, e.g., T1, T2, T3, iterations of the method 200 could identify causation relationships or lack thereof between faults of the various tasks. For instance, it could be determined that a fault in task T1 caused the fault in task T2, and a fault in task T3 was caused by the fault of T2, and/or was cause by the fault in T1, as the case may be.

The method 200 may end or be repeated, such as regarding other task T combinations and/or offset O values, as provided above.

IV. Use Cases for Present Technology

The present technology can be used to diagnose faults in a variety of circumstances. Four exemplary circumstances are: (i) challenge-response security systems; (ii) task failure sequences; (iii) timing faults; and (iv) bus faults.

In (i) a challenge-response security system scenario, the technology of the present disclosure is used to break a cyclical dependency. In this scenario (not shown in the figures), a first exemplary task A provides a challenge to a second task B. In response, task B responds to A with a response to the challenge. Based on the response of B, task A provides another challenge to task B. Using the present technology, the source of faults in task A and B can be diagnosed if the execution/communication cycle in which the faults occur is known. If the faults occurred in the same cycle, the cause of the faults in B is mostly likely task A. If the faults occurred in consecutive cycles, the fault in task B is most likely the cause of the fault in task A. If the faults occurred in different cycles, then the faults are most likely uncorrelated.

In (ii) the task failure sequence scenario, if a failure of a task is due to a particular order of failure of sensors from which it obtains data over a bus, and considering that tasks can be configured to adapt themselves each time a sensor fails, then identification of order of sensor failures is important or even crucial to root-cause analysis. Identification of order of sensor failures is facilitated by the present technology in the identification and comparison of communication cycles and time slots in which faults occur and are reported in DTC messages.

Tasks often have or are otherwise associated ways (e.g., based on analytical redundancy) for estimating values of sensors, such as from a lookup table, a mathematical model, or a state machine, or others. When a sensor failure is detected, the task could ignore values from the faulty sensor, and use values from the analytical model instead.

In (iii) the exemplary timing fault scenario, a high-priority task A misses a release time, but not a deadline, and another task B misses a release time and a deadline. DTCs are raised for missing the release time of tasks A and B, and missing the deadline of task B. Identifying that all these actions took place in one execution cycle is important or even crucial to determining whether the delay of A caused the missed deadline of task B. In this example, the offset O is set to zero (o), and the method 200 is performed for tasks A and B. The scheduling dependency between them is captured in the task graph. With the aforesaid inputs from the designer, the proposed method 200 can detect that these faults are correlated. In (iv) the exemplary bus fault scenario, data corruption is caused on a bus, such as in connection with an electro-magnetic interference (EMI) or other interference. The present technology enables determination of whether a corruption occurring in one time-based instant (e.g., one portion of the communication cycle or in one time slot) caused a fault in task reading on another portion of the bus. Identification of relevant schedules and cycles in which the errors occurred is important or even crucial for root-cause analysis. A node on the network, such as central bus monitor, can identify time-slots corrupted by noise, and register/send corresponding data in a DTC. Each slot is tied to a message sent by one task to another task. Hence, if, for example, a destination task Td has a software failure and records/sends a DTC, and the DTC from the bus monitor is recorded/received, then the present method 200 can identify that the data corruption on the bus caused the task Td to fail.

V. Implementation of Accurate Diagnoses

Accurately determining whether relationships exist between multiple faults in the system 100 allows the system 100 or a user of the system to take various actions to improve system operation. Some actions, such as automatically re-mapping components in the system 100, can be done substantially in real time, and some actions can be performed after further analysis.

Accurate determination of relationships between faulting tasks or tasks and resources improves the quality of diagnosis and facilitates cause-effect analysis of failures resulting due to manifestation of dependent electronics/software faults. In some embodiments, the diagnosis is an enabler for run-time reconfiguration of tasks and resources. The diagnosis can also provide insight into system design or implementation in system simulation, testing, and validation, such as by analyzing system performance following purposeful introduction/injection of faults/errors to prove designed mitigation mechanisms. The improved diagnosis also increases confidence in fault-tolerance support, which is especially important in high-sensitivity applications, such as safety-critical applications, and could therein be an enabler for run-time reconfiguration.

The diagnosis and/or the post-diagnosis actions can be performed local to the faults, such as on-line in an onboard computer of a vehicle in which the faults occurred, and/or off-line, such as remote from the location of the faults, such as off-board the vehicle. For off-board diagnosis or post-diagnosis actions, the requisite data (e.g., DTC, task graph, and resource map data) can be communicated to a remote system in a variety of ways, such as by wired connection (e.g., in an automotive garage), wirelessly, or by transferring a memory unit, such as a memory chip or card storing certain information related to vehicle operation. Some of the data needed for diagnosis may already be provided at the remote computer, such as the task graph and/or resource map. Data from vehicle operation, including DTCs, could also be provided to a user of the system (e.g., an operator of a vehicle) or personnel evaluating the system 100 (e.g., a technician).

Post-diagnosis actions can include identifying a faulting task, removing a task or resource from operation or connectivity to one or more tasks or resources, replacing a task or resource, re-executing a cycle or function to confirm existence or continued existence of the fault(s) or that the fault is transient, performing maintenance on a task or resource, enabling operation around one or more faults, masking a fault, and re-mapping, or otherwise altering or dynamically reconfiguring the system 100, to overcome the negative effects of the identified faults.

One example of masking a fault is for a first task to use an estimated value as effective output of a faulting task instead of an actual value from the faulting task on which the first task relies for data, as described above regarding analytical redundancy.

In an example of re-mapping, two tasks depend on a first resource, such as a first source of acceleration information in a vehicle, but none of them depend from each other. This dependence can be recorded, for instance, in a resource map. If both tasks experience a fault, the technology of the present disclosure would determine that the faults were not coincidental, but are uncorrelated.

In this example, the system 100 may be programmed to automatically identify a corrective action for the situation based on the diagnosis that the faults are uncorrelated. For instance, the processor could re-map the system 100 so that the two tasks receive vehicle acceleration data from a second vehicle source. For example, the first vehicle acceleration source could be an accelerometer, and the other could be a computing module calculating acceleration based on changes in vehicle speed data received from wheel sensors. The first resource may be preferred, for whatever reasons, but mapping the tasks to the second source allows continued operation, at least at the time.

In an example of enabling operation around a fault, a functions of a subject task include obtaining a first piece of required data from a first task, a second piece of optional data from a third task, and a third piece of required data from a fourth task. If a fault occurs in the subject task and the third task, the processor can accurately determine that the faults are correlated, and based on this diagnosis, reconfigure the functions of the subject task to not include obtaining the second piece of data, at least until the second task is repaired or replaced, for example.

Various embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims. Use of first, second, etc., in the claims do not signify any order of occurrence, importance, or the like, unless such order is expressly provided. Reference to a single element may include multiple of the same element.

The invention claimed is:

1. A method executed by a computer processor of an observing device for classifying faults in an electronic network utilizing a time-triggered communication system and a high-resolution time component, the method comprising:
   (i) the processor receiving a first fault code generated at a first task of the electronic system in response to a first fault at the first task, wherein the first fault code identifies:
      a first communication cycle of the electronic system associated with the first fault; and
      a first slot, corresponding to the first task, of a first message in which the first fault code is transmitted to the processor;
   (ii) the processor receiving a second fault trouble code generated at a second faulting task of the electronic system in response to a second fault, wherein the second fault code identifies:
      a second communication cycle of the electronic system associated with the second fault; and
      a second slot, corresponding to the second task, of a second message in which the second fault code is transmitted to the processor,
   wherein the first slot and the second slot are populated with the first fault code and the second fault code, respectively, based on time synchronized with respect to the high-resolution time component;
   (iii) the processor identifying an execution cycle offset associated with the first task and the second task using an execution schedule;
   (iv) the processor considering whether the first cycle, of the first fault trouble code, is separated from the second cycle, of the second fault trouble code, by the execution cycle offset identified by the schedule;
   (v) if the processor determines that the first cycle is not separated from the second cycle by the execution cycle offset, the processor further determining that the first fault did not cause the second fault;
   (vi) if the processor determines that the first cycle is separated from the second cycle by the execution cycle offset, the processor considering whether operation of any of the tasks is dependent on operation of any other of the tasks based on task-dependency data;
   (vii) if the processor determines that operation of none of the tasks is dependent on operation of another of the tasks, the processor further determining that the first fault and the second fault are coincidental;
   (viii) if the processor determines that operation of at least one of the tasks is dependent on operation of at least one other of the tasks, the processor considering whether operation of the second task is dependent on operation of the first task;
   (ix) if the processor determines that operation of the second task is dependent on operation of the first task, the processor further determining that the failure of the first task caused the failure in the second task; and (x) if the processor determines that operation of the second task is not dependent on operation of the second task, the processor further determining that the first fault did not cause the second fault.

2. The method of claim 1, further comprising:
(xi) the processor considering whether operation of the first task is dependent on operation of the second task;
(xii) if the processor determines that operation of the first task is dependent on operation of the second task, the processor further determining that the failure of the second task caused the failure in the first task; and
(xiii) if the processor determines that operation of the first task is not dependent on operation of the first task, the processor further determining that the second fault did not cause the first fault.

3. The method of claim 1, wherein:
the execution cycle offset is an initial cycle offset;
the method further comprises:
re-performing step (iii) to identify another cycle offset; and
re-performing steps (iv)-(x) using the other cycle offset instead of the initial cycle offset.

4. The method of claim 1, wherein:
the first task operates in a first cyclical schedule, timing of which is dictated by the high-resolution time component; and
the second task operates in a second cyclical schedule, timing of which is dictated by the high-resolution time component.

5. The method of claim 1, further comprising:
the processor arranging the task-dependency data based on inputs including at least one data set selected from a group of data sets consisting of:
a task graph; and
a resource map.

6. The method of claim 1, further comprising performing an action to improve functioning of the network based on classification of the faults.

7. The method of claim 6, wherein the action includes:
identifying a task of the first task and the second task to mask based on the classification; and
masking the selected task.

8. The method of claim 1, further including performing a pair-wise analysis including, in addition to performing steps (i) through (x) with respect to a combination of the first task and the second task, repeating steps (i) through (x) except with the combination of the first task and the second task being replaced with a combination of tasks selected from a group of task combinations consisting of:
the second and the first task;
a third task and the second task;
the first task and a third task; and
the third task and a fourth task.

9. A tangible, non-transitory computer-readable medium of an observing device including instructions that, when executed by a processor, cause the processor to perform steps for classify faults in an electronic network utilizing a time-triggered communication system and a high-resolution time component, the steps comprising:
(i) receiving a first fault code generated at a first task of the electronic system in response to a first fault at the first task, wherein the first fault code identifies:
a first communication cycle of the electronic system associated with the first fault; and
a first slot, corresponding to the first task, of a first message in which the first fault code is transmitted to the processor;
(ii) receiving a second fault trouble code generated at a second faulting task of the electronic system in response to a second fault, wherein the second fault code identifies:
a second communication cycle of the electronic system associated with the second fault; and
a second slot, corresponding to the second task, of a second message in which the second fault code is transmitted to the processor,
wherein the first slot and the second slot are populated with the first fault code and the second fault code, respectively, based on time synchronized with respect to the high-resolution time component;
(iii) identifying an execution cycle offset associated with the first task and the second task using an execution schedule;
(iv) considering whether the first cycle, of the first fault trouble code, is separated from the second cycle, of the second fault trouble code, by the execution cycle offset identified by the schedule;
(v) if the first cycle is not separated from the second cycle by the execution cycle offset, determining that the first fault did not cause the second fault;
(vi) if the first cycle is separated from the second cycle by the execution cycle offset, considering whether operation of any of the tasks is dependent on operation of any other of the tasks based on task-dependency data;
(vii) if operation of none of the tasks is dependent on operation of another of the tasks, determining that the first fault and the second fault are coincidental;
(viii) if operation of at least one of the tasks is dependent on operation of at least one other of the tasks, considering whether operation of the second task is dependent on operation of the first task;
(ix) if operation of the second task is dependent on operation of the first task, determining that the failure of the first task caused the failure in the second task; and
(x) if operation of the second task is not dependent on operation of the second task, determining that the first fault did not cause the second fault.

10. The tangible, non-transitory computer-readable medium of claim 9, wherein the instructions further cause the processor to:
(xi) considering whether operation of the first task is dependent on operation of the second task;
(xii) if operation of the first task is dependent on operation of the second task, determining that the failure of the second task caused the failure in the first task; and
(xiii) if operation of the first task is not dependent on operation of the first task, determining that the second fault did not cause the first fault.

11. The tangible, non-transitory computer-readable medium of claim 10, wherein:
the execution cycle offset is an initial cycle offset; and
the instructions further cause the processor to:
re-perform step (iii) to identify another cycle offset; and
re-perform steps (iv)-(x) using the other cycle offset instead of the initial cycle offset.

12. The tangible, non-transitory computer-readable medium of claim 10, wherein the instructions further cause the processor to:
arrange the task-dependency data based on inputs including at least one data set selected from a group of data sets consisting of:
a task graph; and
a resource map.

13. The tangible, non-transitory computer-readable medium of claim 10, wherein the instructions further cause the processor to perform an action to improve functioning of the network based on classification of the faults.

14. The tangible, non-transitory computer-readable medium of claim 10, wherein the instructions further cause the processor to perform a pair-wise analysis including, in addition to performing steps (i) through (x) with respect to a combination of the first task and the second task, repeating steps (i) through (x) except with the combination of the first task and the second task being replaced with a combination of tasks selected from a group of task combinations consisting of:
the second and the first task;
a third task and the second task;
the first task and a third task; and
the third task and a fourth task.

15. A transportation vehicle comprising:
a high-resolution time component;
an electronic network including a first task and a second task, the electronic network being configured to utilize a time-triggered communication system based on the high-resolution time component; and
an onboard computer including:
 a processor; and
 a tangible, non-transitory computer-readable medium including instructions that, when executed by the processor, cause the processor to perform steps for classify faults in the electronic network comprising:
(i) receiving a first fault code generated at a first task of the electronic system in response to a first fault at the first task, wherein the first fault code identifies:
 a first communication cycle of the electronic system associated with the first fault; and
 a first slot, corresponding to the first task, of a first message in which the first fault code is transmitted to the processor;
(ii) receive a second fault trouble code generated at a second faulting task of the electronic system in response to a second fault, wherein the second fault code identifies:
 a second communication cycle of the electronic system associated with the second fault; and
 a second slot, corresponding to the second task, of a second message in which the second fault code is transmitted to the processor,
wherein the first slot and the second slot are populated with the first fault code and the second fault code, respectively, based on time synchronized with respect to the high-resolution time component;
(iii) identifying an execution cycle offset associated with the first task and the second task using an execution schedule;
(iv) considering whether the first cycle, of the first fault trouble code, is separated from the second cycle, of the second fault trouble code, by the execution cycle offset identified by the schedule;
(v) if the first cycle is not separated from the second cycle by the execution cycle offset, determining that the first fault did not cause the second fault;
(vi) if the first cycle is separated from the second cycle by the execution cycle offset, considering whether operation of any of the tasks is dependent on operation of any other of the tasks based on task-dependency data;
(vii) if operation of none of the tasks is dependent on operation of another of the tasks, determining that the first fault and the second fault are coincidental;
(viii) if operation of at least one of the tasks is dependent on operation of at least one other of the tasks, considering whether operation of the second task is dependent on operation of the first task;
(ix) if operation of the second task is dependent on operation of the first task, determining that the failure of the first task caused the failure in the second task; and
(x) if operation of the second task is not dependent on operation of the second task, determining that the first fault did not cause the second fault.

16. The transportation vehicle of claim 15, wherein the instructions of the tangible, non-transitory computer-readable medium further cause the processor to:
(xi) consider whether operation of the first task is dependent on operation of the second task;
(xii) if operation of the first task is dependent on operation of the second task, determine that the failure of the second task caused the failure in the first task; and
(xiii) if operation of the first task is not dependent on operation of the first task, determine that the second fault did not cause the first fault.

17. The transportation vehicle of claim 15, wherein:
the execution cycle offset is an initial cycle offset; and
the instructions of the tangible, non-transitory computer-readable medium further cause the processor to:
 re-perform step (iii) to identify another cycle offset; and
 re-perform steps (iv)-(x) using the other cycle offset instead of the initial cycle offset.

18. The transportation vehicle of claim 15, wherein the instructions of the tangible, non-transitory computer-readable medium further cause the processor to:
arrange the task-dependency data based on inputs including at least one data set selected from a group of data sets consisting of:
a task graph; and
a resource map.

19. The transportation vehicle of claim 15, wherein the instructions of the tangible, non-transitory computer-readable medium further cause the processor to perform an action to improve functioning of the network based on classification of the faults.

20. The transportation vehicle of claim 15, wherein the instructions of the tangible, non-transitory computer-readable medium further cause the processor to perform a pair-wise analysis including, in addition to performing steps (i) through (x) with respect to a combination of the first task and the second task, repeating steps (i) through (x) except with the combination of the first task and the second task being replaced with a combination of tasks selected from a group of task combinations consisting of:
the second and the first task;
a third task and the second task;
the first task and a third task; and
the third task and a fourth task.

* * * * *